(12) United States Patent
    Calvert

(10) Patent No.: US 9,108,479 B1
(45) Date of Patent: Aug. 18, 2015

(54) TRAIN TRACK ENABLED HELICOPTER

(71) Applicant: TTEH Associates, Trustee for Train track enabled helicopter CRT Trust, Manassas, VA (US)

(72) Inventor: S. Mill Calvert, Manassas, VA (US)

(73) Assignee: TTEH Associates, Trustee for Train track enabled helicopter CRT Trust, Manassas, CA (US)

( * ) Notice: Subject to any disclaimer, the term of this patent is extended or adjusted under 35 U.S.C. 154(b) by 0 days.

(21) Appl. No.: 14/672,695

(22) Filed: Mar. 30, 2015

(51) Int. Cl.
| | | |
|---|---|---|
| B64C 37/00 | (2006.01) |
| B60F 5/02 | (2006.01) |
| B64C 27/04 | (2006.01) |
| B64C 25/10 | (2006.01) |
| B64C 25/34 | (2006.01) |
| B64C 25/40 | (2006.01) |
| B64C 25/32 | (2006.01) |

(52) U.S. Cl.
CPC . *B60F 5/02* (2013.01); *B64C 25/10* (2013.01); *B64C 25/34* (2013.01); *B64C 25/405* (2013.01); *B64C 27/04* (2013.01); *B64C 37/00* (2013.01); *B60F 2301/04* (2013.01); *B64C 2025/325* (2013.01)

(58) Field of Classification Search
USPC .................................. 244/1 R, 2, 3
See application file for complete search history.

(56) References Cited

U.S. PATENT DOCUMENTS

| | | | | |
|---|---|---|---|---|
| 2,927,747 | A * | 3/1960 | Bennie | 244/17.17 |
| 3,279,722 | A * | 10/1966 | Glover, Jr. et al. | 244/50 |
| 4,600,168 | A * | 7/1986 | Selecman | 244/50 |
| 4,883,241 | A * | 11/1989 | Snead | 244/114 R |
| 6,363,861 | B1 | 4/2002 | Strehler | |
| 6,868,793 | B2 * | 3/2005 | Hoffman et al. | 105/136 |
| 2008/0283661 | A1 * | 11/2008 | Henley | 244/114 R |

* cited by examiner

*Primary Examiner* — Christopher P Ellis
*Assistant Examiner* — Richard G Davis
(74) *Attorney, Agent, or Firm* — Louis Ventre, Jr.

(57) ABSTRACT

A system enables a helicopter to land on and be conveyed on a train track. The system includes the helicopter with extensible legs attached to the helicopter. The legs extend to below the fuselage to a point below the standard landing gear so that they can engage the railroad tracks. There is a rail wheel rotatably attached to the lower end of each leg. The rail wheels are what ride on the railroad tracks and provide the support needed to maintain the helicopter in position on the railroad tracks. A motor is connected to at least one rail wheel so that it can be activated to rotate the rail wheel to propel the helicopter on the railroad tracks. The system may include an adjustment beam to slide two adjacent rail wheels together or apart so as to permit the rail wheels to engage differing railroad tracks.

2 Claims, 4 Drawing Sheets

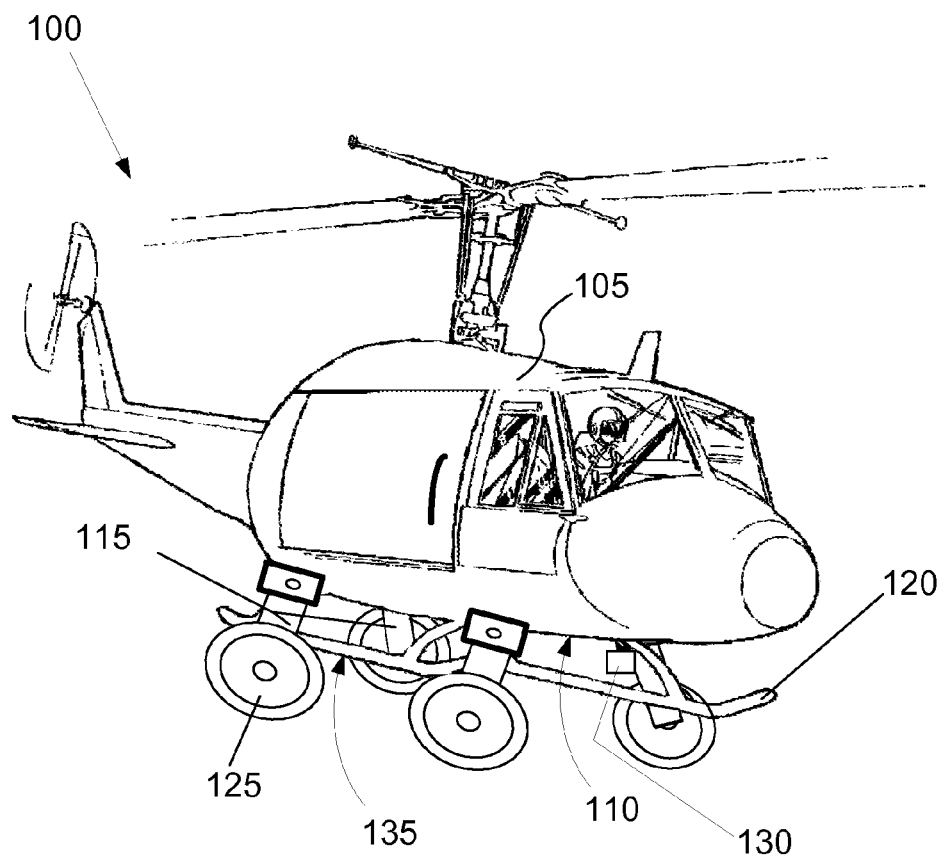
FIG.1
FIG.2
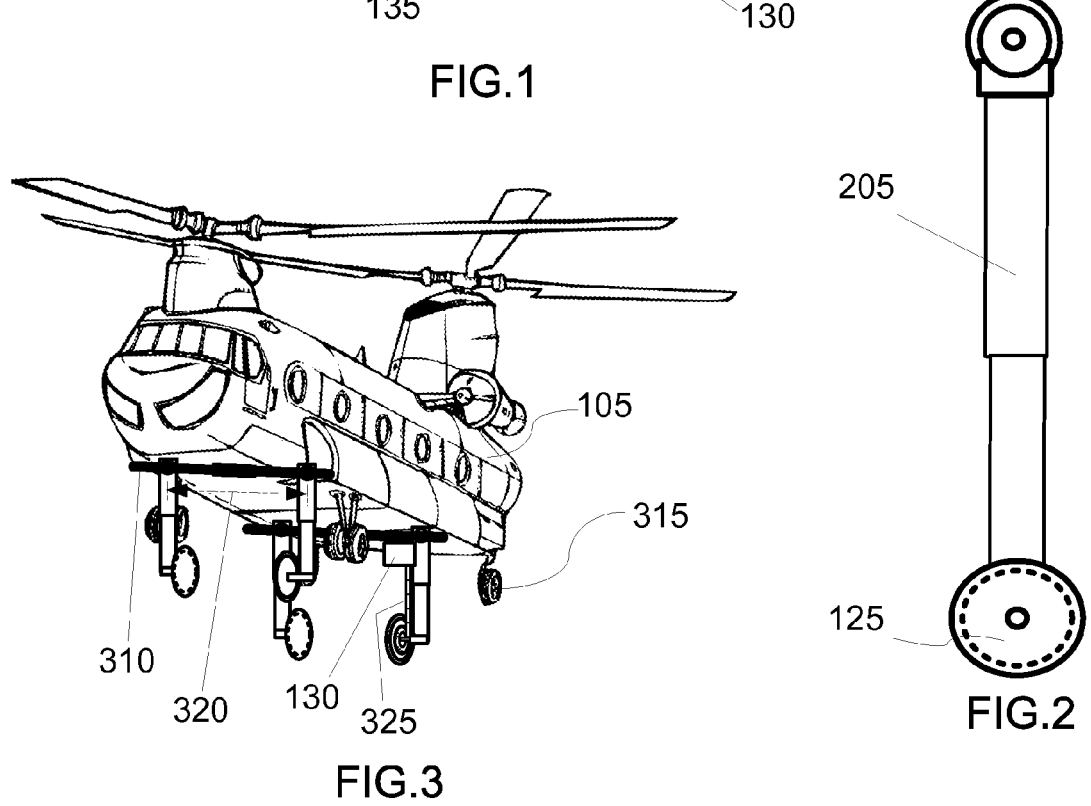
FIG.3

TRAIN TRACK ENABLED HELICOPTER

TECHNICAL FIELD

In the field of aeronautics and astronautics, a device and structural arrangement attached to an aircraft for supporting the aircraft on train tracks using wheels to support and propel the aircraft on the train tracks.

BACKGROUND ART

In mankind's technological development advancement of his transportation technology, the "iron horse" that replaced the covered wagon and horse and buggy of the past was a very significant advancement. The territory of countries was blanketed and cris-crossed with a large network of rails and train tracks that ran to almost every city, town, and village. This helped to create an Industrial Revolution and open many new markets. In the modern day, even though rail trade is a small fraction of what it used to be, the vast network of railroad tracks still exist.

This vast transportation infrastructure is an asset to military planners, but they usually overlook its potential. The real innovator of using railroad tracks for military use in wartime is Robert E. Lee during the Civil War. He used the Manassas Gap Railroad in Virginia to move substantial equipment, troops, and supplies. His example caused many planners for years to come to use the rails for military purposes. Since most equipment is now moved by air and truck, military planners have overlooked the rails as old technology.

By using the innovation of Robert E. Lee and combining the rails with current, state of the art military technology, the rails can once again help in accomplishing military goals. The new invention for this old and new technology is called the train track enabled helicopter.

Train track enabled helicopter enables our troops and special-forces soldiers to fly into enemy territory in a state of the art attack helicopter, but then covertly convert the helicopter to a stealth railroad car that can quietly drive deep into enemy territory along their rails. Our special forces could quietly go hundreds of miles into the enemy country while not in any way showing up on radar. The mindset of the enemy is to look for aircraft in their airspace and they would never think that their old system of little-used railroad tracks would lead to their defeat. Who could even imagine a helicopter that transforms into a railcar?

SUMMARY OF INVENTION

A system enables a helicopter to land on and be conveyed on a train track. The system includes the helicopter having a fuselage and standard landing gear. In addition, the system further includes legs attached to the helicopter. The legs extend below the fuselage to a point below the standard landing gear so that they can engage the railroad tracks. There is a rail wheel rotatably attached to the lower end of each leg. The rail wheels are what ride on the railroad tracks and provide the support needed to maintain the helicopter in position on the railroad tracks. A motor is connected to at least one rail wheel so that it can be activated to rotate the rail wheel to propel the helicopter on the railroad tracks. The system may include an adjustment beam to slide two adjacent rail wheels together or apart so as to permit the rail wheels to engage differing railroad tracks.

TECHNICAL PROBLEM

A stealth means for quickly moving troops within enemy territory needs to be provided preferably by low-cost modifications to existing military rotorcraft. When rail lines exist in enemy territory, it would be advantageous if a helicopter could quietly fly to a remote rail access point and be quickly modified to run on the rail lines.

SOLUTION TO PROBLEM

The solution is a rotorcraft, such as a helicopter, outfitted with deployable legs holding rail wheels and propelled by a quiet battery-powered electric motor.

ADVANTAGEOUS EFFECTS OF INVENTION

The system provides stealth ground access to enemy territory. A helicopter team can fly to a railroad access point and lower train-track-functional rail wheels below the standard helicopter landing gear. These rail wheels are lowered via powered mechanism, such as hydraulics, electric drive or pneumatic action, so as to deploy below the standard helicopter landing gear. At least one of the rail wheels is powered by a supplemental battery-driven electric motor. This electric drive system gives our forces the ability to quietly drive along enemy tracks in the darkness of night. The blades on the helicopter are preferably folded back so they do not hit anything while the helicopter drives along the tracks. The drive system preferably enables it to be driven at different speeds in a forward or backward direction. At anytime needed, the helicopter can be converted back to a helicopter to quickly lift off of the tracks and fly.

This is a new technology that even Robert E. Lee would be proud of. It gives our special forces a superior advantage that the enemy does not have and has never even thought of. It will help to win the War on Terror and protect the lives of our brave special-forces soldiers.

BRIEF DESCRIPTION OF DRAWINGS

The drawings illustrate preferred embodiments of the train track enabled helicopter according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 1 is a perspective of a preferred embodiment of the train track enabled helicopter where the helicopter standard landing gear comprises skids.

FIG. 2 is an elevation view of a telescoping leg with a rail wheel attached.

FIG. 3 is a perspective of another preferred embodiment of the train track enabled helicopter where the helicopter standard landing gear comprises tires.

DESCRIPTION OF EMBODIMENTS

Figure 4:
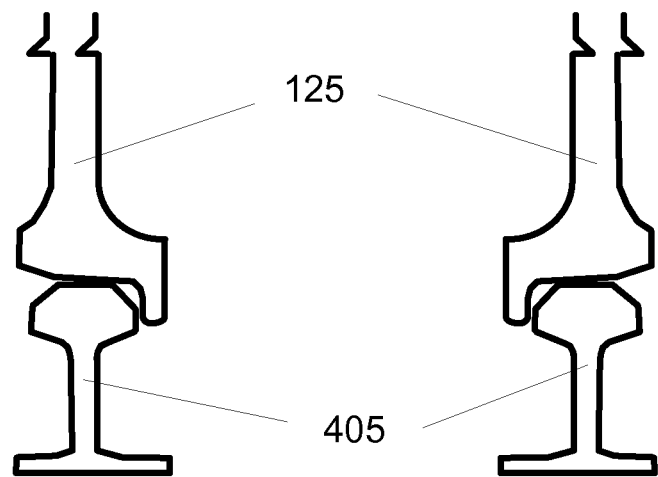
FIG. 4 is a side elevation view showing how two rail wheels of the train track enabled helicopter sit on railroad tracks.
Figure 5:
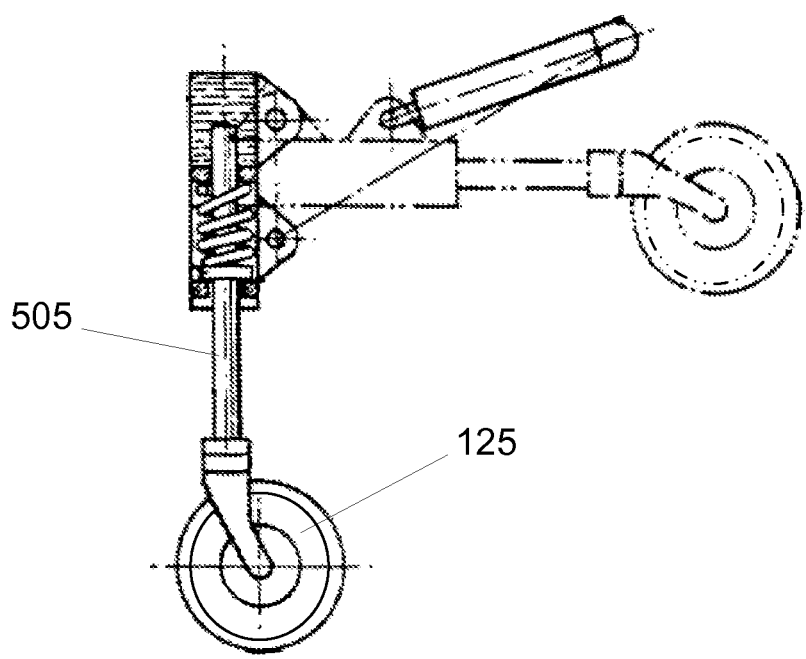
FIG. 5 is a side elevation view of a rotating leg and rail wheel for embodiments that extend the rail wheels using the rotating leg.
Figure 6:
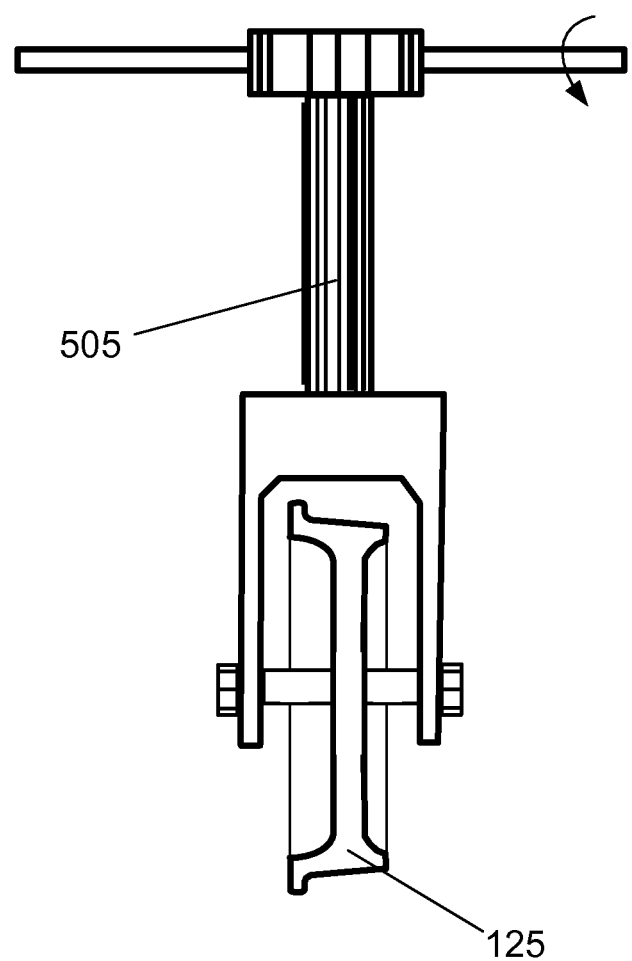
FIG. 6 is a front elevation view of an alternate embodiment of a rotating leg.

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

FIG. 1 is a side elevation view of a preferred embodiment of the system (100) creating a train track enabled helicopter. The system (100) includes a helicopter (105), a plurality of legs (115); a rail wheel (125) for each of the legs; and a motor (130).

In the system (100), the helicopter (105) is configured to land on and propel itself on railroad tracks (405). The helicopter (105) is not limited to any specific helicopter type. Rather, the helicopter (105) is a type of rotorcraft that derives both lift and propulsion from one or more sets of horizontally revolving rotor blades. The rotor blades on the helicopter are preferably configured to be folded back, to wit, aligned along the top of the fuselage, so as to avoid unintended interference with trees or other objects alongside the tracks as the helicopter is propelled on the tracks. The helicopter (105) includes a fuselage (110) and standard landing gear, such as skids (120), tires (315), pontoons (not shown) or other mechanism to support the fuselage (110) upon touchdown.

The plurality of legs (115) is attached to the helicopter (105), typically on the underside of the fuselage (110). Preferably, there are four legs in the plurality of legs (115), but stable configurations may involve three or more than four legs. Preferably, the plurality of legs (115) is held in a storage position at an elevation above the standard landing gear. This storage position may be within the fuselage (110), but is preferably above the bottom of the landing gear (135) and under the fuselage (110). When the plurality of legs (115) is in the storage position the helicopter (105) can land normally on a flat landing platform using its standard landing gear without having any of the rail wheels impact the landing platform.

In order to deploy the rail wheels from the storage position for use, each leg in the plurality of legs (115) is adapted to extend below the fuselage (110) to a point below the standard landing gear. While manual extension may be possible, preferred embodiments use remotely operable electric, hydraulic, or air pressure for powered extension of the plurality of legs. As non-limiting examples, extension may be by a telescoping leg (205) or a rotating leg (505). Extension of the legs from the storage position to a deployed position enables the rail wheels to have contact with the railroad tracks (405) without interference from the helicopter's standard landing gear.

Each rail wheel (125) is rotatably attached to an end of each such leg in the plurality of legs (115). Rotation enables the wheel to turn on its axis and thus be an important part of the means of conveyance on the railroad tracks (405). Thus, each leg in the plurality of legs has a rail wheel (125) attached at the bottom end of the leg, i.e., the part of the leg extending below the standard landing gear. Each rail wheel (125) is configured to ride on the railroad tracks (405) as shown in FIG. 4. In order to enable the train track enabled helicopter to travel on railroad tracks, the plurality of legs (115), when extended, is configured to support the helicopter (105) in position on the railroad tracks (405).

Figure 7:
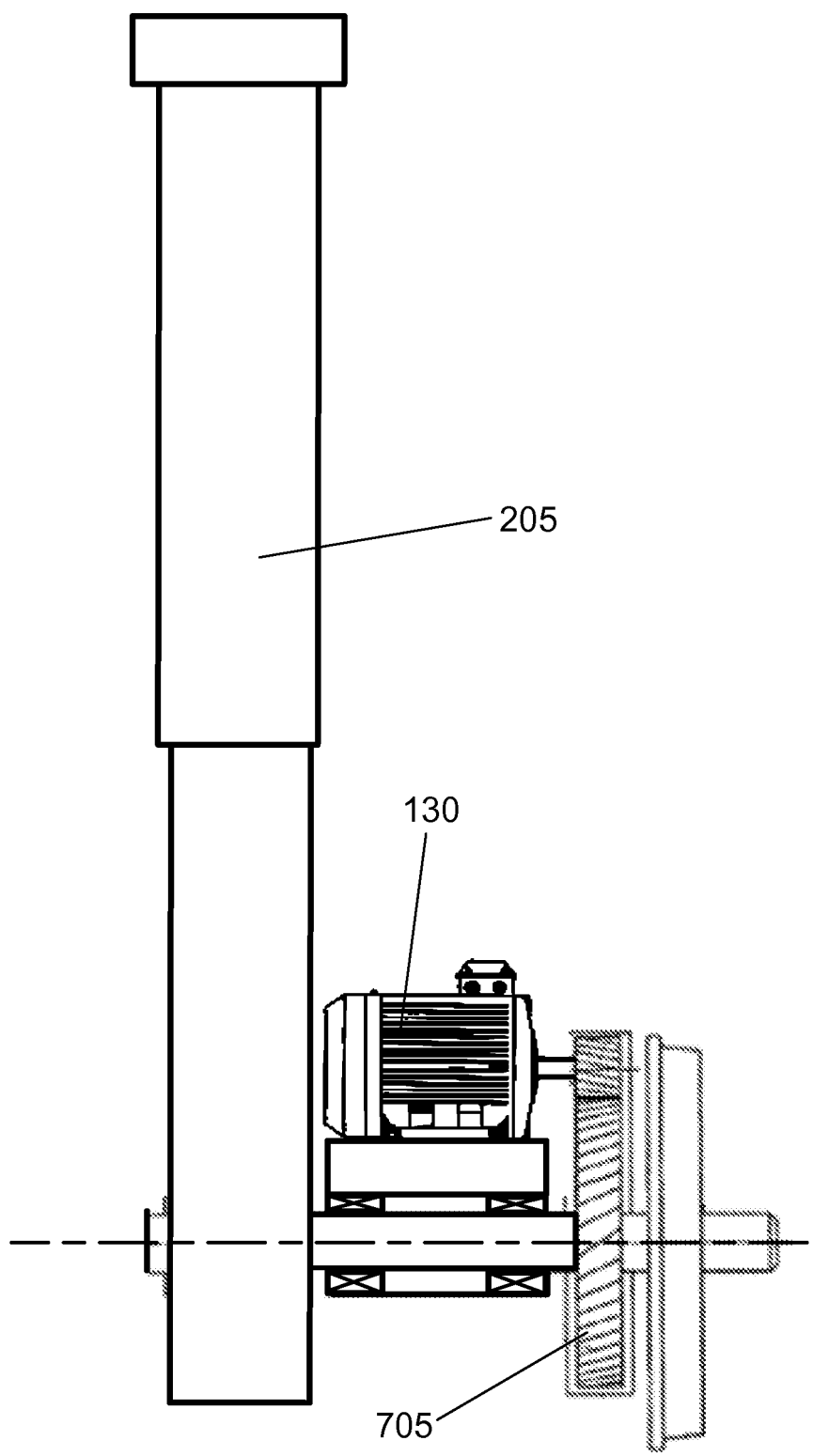
FIG. 7 is a side elevation view of another embodiment of a rotating leg with a motor positioned near the rail wheel.

The motor (130) is connected to at least one rail wheel. Since weight is a concern for a helicopter, one motor powering one rail wheel may be desirable. However, other embodiments where one motor powers two rail wheels or one motor for each leg may be envisioned. The motor (130) is adapted to be activated to rotate the rail wheel (125) when the helicopter (105) is atop the railroad tracks (405) so as to propel the helicopter (105) on the railroad tracks (405). An example is the geared arrangement (705) shown in FIG. 7 where the motor is near the axle of the rail wheel. FIG. 3 illustrates an arrangement where the motor (130) is near the fuselage (110) with an extensible rotatable rod with a bottom gear (325) connecting the motor to a spiral bevel gear connected to the rail wheel (125). An example of a spiral bevel gear arrangement is found in a vehicle differential where the direction of drive from the drive shaft must be turned 90 degrees to drive the wheels.

If one motor powers two rail wheels, then that motor is similarly adapted to be activated to rotate the rail wheel (125) when the helicopter (105) is atop the railroad tracks (405) so as to propel the helicopter (105) on the railroad tracks (405). Whatever the combination of motors and legs, that combination is capable of propelling the helicopter (105) on the railroad tracks (405).

It is well known that railroad tracks can have different spacing in the spacing of the rails. For example, two standard tracks include a narrow track spacing of 1000 millimeters and a wide standard track spacing of 1435 millimeters. Thus, to be operationally flexible, the system (100) preferably has a means of adjusting the separation of the rail wheels across the width of the helicopter (105). A preferred embodiment has an adjustment beam (310) or threaded rod that may be used to change the distance separating two legs. Preferably, there is an adjustment beam (310) for each pair of legs across the width of the helicopter. Thus, for alternative embodiments, the system (100) includes an adjustment beam (310) for two legs in the plurality of legs (115), the adjustment beam (310) adapted to change a distance (320) separating the rail wheels on the two legs so as to permit the rail wheels to engage differing railroad tracks (405).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the aircraft and defense industries.

What is claimed is:

1. A system comprising a helicopter configured to land on and propel itself on railroad tracks, the helicopter comprising a fuselage and standard landing gear, the system further comprising:
   a plurality of legs attached to the helicopter, wherein each leg in the plurality of legs is adapted to extend below the fuselage to a point below the standard landing gear;
   a rail wheel rotatably attached to an end of each such leg in the plurality of legs, each rail wheel configured to ride on the railroad tracks, wherein when the plurality of legs is extended, said plurality of legs is configured to support the helicopter in position on the railroad tracks; and
   a motor connected to at least one rail wheel, wherein the motor is adapted to be activated to rotate said rail wheel when the helicopter is atop the railroad tracks so as to propel the helicopter on the railroad tracks.

2. The system of claim 1, further comprising an adjustment beam for two legs in the plurality of legs, the adjustment beam adapted to change a distance separating the rail wheels on the two legs so as to permit the rail wheels to engage differing railroad tracks.

* * * * *